2,957,791

OPAQUE POROUS PRESSURE-CLARIFIABLE FILMS OF ADDITION POLYMERS

Max Frederick Bechtold, Kennett Square, Pa., assignor to E. I. du Pont de Nemours and Company, Wilmington, Del., a corporation of Delaware No Drawing. Original application Dec. 3, 1954, Ser. No. 473,047, now Patent No. 2,848,752, dated Aug. 26, 1958. Divided and this application Jan. 21, 1960, Ser. No. 3,726

11 Claims. (Cl. 154—46)

This invention relates to opaque porous films of synthetic hydrophobic vinylidene-type organic addition polymers.

This application is a continuation-in-part of my application, Serial No. 718,214, filed February 28, 1958, now abandoned, which is a continuation-in-part of my application, Serial No. 383,374, filed September 30, 1953 (now U.S. 2,846,727), and a division of my copending application Serial No. 473,047, filed December 3, 1954 (now U.S. 2,848,752).

Films from organic polymers are often made by melting the polymer and extruding it under pressure. Also, organic solvents and particularly water-insoluble solvents are used for the casting of films from solutions. There are disadvantages in the latter process since considerable solvent is required to obtain a fluid solution of a high polymer. Solvent recovery problems and health hazards are involved in their use. Solutions relatively high in polymer content often degrade in molecular weight, when heat is employed to bring about dissolution. Extremely high viscosity results as the concentration of high molecular weight polymer increases in any solvent. Compromises on either lower polymer content or lower molecular weight polymer in order to attain a viscosity sufficiently low for casting of films, generally give an inferior quality product.

Films obtained from synthetic organic polymers by the above methods are generally transparent and nonporous. Opaque films are usually made by the addition of opacifying agents, such as inorganic pigments. These agents do not increase the porosity or permeability of the hydrophobic polymer to any substantial degree. Attempts to obtain porous articles have heretofore involved combination of the melt extrusion or solution technique with blowing agents or foaming techniques, which are difficult to control to give reproducible porosity. Porosity obtained by such methods is generally of the enclosed void type, which have a low degree of permeability. Furthermore, such products do not have much receptivity for ink, nor does pressure cause clarification. Heretofore, no non-pigmented film prepared from a synthetic organic polymer of ethylenically unsaturated monomers has the ink receptivity and opacity to be an adequate film as a substitute for paper.

It is an object of this invention to provide novel porous, opaque films of vinylidene-type organic addition polymers, and more particularly such films which are porous, opaque, non-fibrous, and can be selectively cleared by pressure, heat or solvents. Another object is to provide such films which are receptive to ink in a manner similar to paper.

The novel films provided by this invention are porous, opaque, non-fibrous films of low bulk density composed of partially coalesced discrete particles of a hydrophobic organic addition polymer of at least one ethylenically unsaturated monomer selected from the group consisting of vinyl and vinylidene monomers, said polymer having a wholly carbon chain, a molecular weight of at least 10,000, the units of the polymer having an average molecular weight of below 150 and preferably about 45 to about 150; said film having an open-cell structure characterized by microscopic voids uniformly disposed throughout and communicating with the surface, the open-cell voids, as measured by a conventional mercury intrusion method, being of substantially uniform size, averaging less than a micron and preferably less than ½ micron in their average diameter and constituting 20% to 80% by volume of the film, said film [a] having a degree of opacity such that a thickness of 3-mils and greater has a light-transmission of less than 10% at 4000 A., and upon being subjected to a pressure of 10,000 pounds per square inch at room temperature has at least a 3-fold increase in light transmission, and [b] sustaining a permanent reduction in thickness of about 20% to about 80% when subjected to such pressure and temperatures. The low bulk density films of the invention, moreover, are highly permeable, their permeability to water vapor being at least 10 times greater than the corresponding films of the same polymer and thickness which are non-porous or which have closed-cell voids. The films or coatings of this invention, because of the microscopic void structure communicating with the surface, are highly opaque. The bulk densities of the films, in general, are from about 0.25 to 1.0 gram per cc. The opacity of these films is such that not more than 10%, generally 5% or less, of light is transmitted (measured at 4000 A. on G.E. spectrophotometer, Cat. 5962004G65, using films of about 3 mils thickness). A further characteristic is that the clarified film (obtained by a pressure of about 10,000 lbs./sq. in. at room temperature, i.e., 25° C.) transmits at least 3-times as much light, generally over 5 and preferably 10-times or more, as the opaque original film. In addition, the self-supporting or supported films or coatings have a high degree of receptivity to both aqueous and non-aqueous ink, irrespective of the specific polymer from which they are made. Thus, they are useful as films or sheets on which writing, typing or printing may be performed, and the product is not only an adequate substitute for but for many purposes is superior to cellulosic paper.

The porous, opaque, non-fibrous films of the invention can be prepared by the processes of my prior patents referred to above, namely U.S. Patents 2,846,727 and 2,848,752. One of these processes involves (1) the preparation of an aqueous dispersion of the polymer containing, based on the weight of the dispersion, from 10% to 50% of a water-soluble organic solvent for the polymer, the solvent being one which boils above 100° C. and being present in a concentration that is insufficient to dissolve the polymer, (2) shaping the dispersion in the form of a film or coating, (3) removing a substantial amount of the water and organic non-solvents by evaporation from the film until partial coalescence of the polymer occurs, as indicated by substantial clarification with tackiness, (4) washing the tacky structure with water or a liquid in which the polymer is insoluble but which dissolves the solvent for the polymer to produce a coherent film substantially free from dissolved polymer, followed by (5) washing the resultant film substantially free of organic solvent, after which the film is dried at a temperature below the softening point.

The other of such processes useful for the preparation of opaque, clearable, porous films, e.g., from polymethacrylanitrile or copolymers of acrylonitrile with 23–30% (on a molar basis) of isobutylene involves the use of dispersions of these polymers in aqueous metal salt media as follows:

The polymer is dispersed in an aqueous medium having dissolved therein an inorganic salt in an amount of about 4% to about 55% based on the final composition. The salts that are effective in this process are those which in more concentrated solutions dissolve the polymer. Only non-solvent concentrations of the salt are used in making the dispersion. The dispersion is then shaped into a film and water is evaporated from the shaped structure until coalescence occurs. The salt is washed from the resultant shaped article. The shaped article can be readily plasticized by immersing the article while in the gel state in relatively non-volatile liquids or media containing such liquids which are softeners or plasticizers for the polymers. The dispersions contain less than 35% and generally at least 2% by weight of polymer, an amount of salt at least one-half the weight of the polymer but insufficient to form salt solutions which dissolve the polymer, the salt being one whose aqueous solution at a substantially higher concentration of salt and adequate temperature is a solvent for the polymer.

In the following detailed examples, which are given for illustrative purposes only, are shown specific embodiments of this invention. The parts are by weight and all processes were carried out under room conditions unless otherwise stated.

*Example I*

To 32 parts of a powdered acrylonitrile/isobutylene copolymer containing 25.2 mole percent isobutylene was added 48 parts of water and 100 parts of 75% tetramethylurea in water. This mixture was ball-milled for 44 hours to a particle size less than 3 microns. The resultant dispersion was cast with a doctor knife at 20 mils thickness on glass, coalesced by evaporation until clarification took place and the coating became tacky, then was immersed in water, and the film stripped and washed in water. The film was softened in a 10% solution of polyethylene glycol di-2-ethylhexoate plasticizer ("Flexol" 4GO) in isopropyl alcohol, then dried. The dried and softened film was smooth and opaque. The opaque film was 3.6–5.1 mils in thickness and showed a permanent deformation under pressure of 10,000 pounds per square inch of 25.7% at 24° C. and 42.25% at 50° C. The deformation was determined by change in thickness of a film after pressing between inch square blocks for two minutes in a hydraulic press.

When such a film was cast at a thickness of 2.82 mils, it had a light transmission of 0.75% at 4000 A., 2.35% at 5500 A., and 3.1% at 7000 A. After pressing at 10,000 pounds per square inch it had a transmission of 70% at 4000 A., 82% at 5500 A., and 86% at 7000 A. A similar film except it was 7.4 mils thick had a much lower light transmission (less than 0.1% at 4000 A.) but on pressing transmitted 39.25% light, more than a 392% increase.

*Example II*

To 60 parts of a latex (55.6% solids) of the copolymer of vinyl chloride with a minor amount of ethyl acrylate was added a solution of 60 parts tetramethylurea and 90 parts of tert-butyl alcohol and this mixture was ball-milled for four hours to a particle size of less than 3 microns. The resultant dispersion was cast by doctor knife at 10 mils thickness on a ¼-inch polymethyl methacrylate sheet and was dried at room temperature until the coating was clear and tacky. Next, the coating was immersed in water and washed in water for sixteen hours, then withdrawn and dried at room temperature. The coating was opaque, adherent to the polymethyl methacrylate sheeting, and was readily clarified by strokes of stylus instruments, including ball point, pencil and drawing pen points. Straight line and curvilinear figures as well as lettering were obtained as clear lines on the opaque coating on the polymethyl methacrylate sheeting. The resultant "negative" was used for the production of sharp positive photoprints on photographic paper and for the production of photographic transparencies. It also served as an excellent lantern slide for projection of bright line characters where the stylus was used against a dark background (caused by the blocking of the projected light by the non-clarified opaque areas of the slide). Another plastic sheet coated with porous, opaque polyvinyl chloride was topcoated with a standard gelatin-silver halide emulsion, exposed to light through a photonegative, then developed in the usual way to obtain a positive photographic print.

Unsupported opaque films were also prepared by the above procedure, except that glass plates were used instead of the polymethyl methacrylate sheeting as the substrate. Immersion of the coating in water resulted in the removal of the film from the glass. After the stripped film was washed and clamped in an open frame and dried at room temperature, an opaque, strong, porous sheet was obtained. This sheet had the following physical properties:

Thickness _____ 1.7–2.3 mils.
Bulk density _____ 0.60 gram/cc.
Tensile strength _____ 1,392 lb./sq. in.
Elongation _____ 40.9%.
Modulus _____ 49,631 lb./sq. in.
Tear strength _____ 2.3 grams/mil.
Water vapor permeability__ More than 10,500 g. transported per hour at 39.5° C. at 53 mm. pressure differential of water vapor per 100 sq. meters area of film about 2 mils thick.
Deformation at 24°C _____ 10% at 500 lb./sq. in., 28.6% at 1000 lb./sq. in., 34.8% at 2500 lb./sq. in., 54.2% at 5000 lb./sq. in.
Light transmission _____ 2% at 4000 A., 3% at 5500 A., 3.5% at 7000 A.

The following table shown thickness and light transmission data for films prepared by the same procedure. Film "C" was obtained by the use of dimethylformamide in place of tetramethylurea. The second set of data for each show the properties after subjecting the film to a pressure of 10,000 lb./sq. in.

| Film | Thickness (Mils) | Light Transmission, G. E. Spectrophotometer | | |
|---|---|---|---|---|
| | | 4,000 A. | 5,000 A. | 7,000 A. |
| A. Before pressing | 3.8 | 2.6 | 3.5 | 5.2 |
| A. After pressing | 1.4 | 23 | 28 | 38 |
| B. Before pressing | 6.1 | 0.4 | 0.7 | 1.2 |
| B. After pressing | 2.4 | 14 | 20 | 33 |
| C. Before pressing | 2.6 | 2.2 | 2.7 | 3.5 |
| C. After pressing | 1.2 | 23 | 29 | 39 |

A porous opaque film of 2.4 mils thickness prepared as above had a bulk density of 0.45 g./ml. The latter contrasts to a value of 1.2 for a clear film prepared by conventional means. These values indicate a void volume of 63%. By use of an Aminco-Winslow porosimeter, 5.7% of the measured voids were of diameters above 1.0 micron and only 22% above 0.4 micron with the major amount of voids within the range of 0.1 to 0.4 micron. This method gave a porosity of 50% for the film but it does not measure pore sizes of less than 0.06 micron. The difference between the 50% and 63% indicates the presence of voids of less than 0.06 micron. Light scattering measurements (Aughey & Baum, J. Optical Soc. of America 44, 833 (1954)), indicated the voids are primarily of 0.2 micron or less.

*Example III*

About 100 parts of a fluid dispersion which contained 14.5 parts of a copolymer of acrylonitrile and vinylidene chloride was prepared by the peroxy catalyzed polymerization of 30 parts of acrylonitrile with 50 parts of vinylidene chloride in 120 parts of water in the presence of a dispersing agent. The opaque fluid dispersion (one part) was mixed in a mortar and pestle with 2 parts of a solution of dimethylformamide in tertiary butyl alcohol (50/50). The dispersion containing discrete particles of polymer less than 3 microns in average diameter was cast at 10 mils thickness on a plate and the film was dried at room temperature until clear and tacky. The film was immersed in water and washed thoroughly and dried. The resultant film was quite thin (28 microns or 1.1 mils), very opaque (3.05% transmission at 4000 A., 4.1% at 5500 A. and 5.15% at 7000 A.), and underwent a deformation of 47.2% at 10,000 pounds per square inch, with clarification to about 60% transmission at 5500 A. The film was clarified both by impact and by stylus.

*Example IV*

A dispersion was made of the copolymer of Example III except that tetramethylurea was employed in place of the dimethylformamide and 10% polyethylene glycol di-2-ethylhexoate in isopropyl alcohol was used as a softening agent to treat the film, and an opaque polymer film was prepared as described in said example. It was about 58 microns (2.3 mils) in thickness. This had a transmission of 4% at 4000 A. and 11.5% at 5500 A., and underwent a deformation of 58.8% at 10,000 pounds per square inch with clarification to 78.25% transmission at 4000 A. and 86% at 5500 A.

*Example V*

An acrylonitrile/isobutylene copolymer was prepared according to the general procedure of U.S. 2,531,196. The copolymer has an inherent viscosity of 1.16 (0.2% concentration by weight in dimethylformamide at 25° C.) and contained 25.2 mol percent of isobutylene.

A coalescible dispersion of the polymer was formed by milling for 88 hours the following materials in a ball mill containing ½ inch glass balls:

32 parts of the acrylonitrile/isobutylene copolymer
80 parts of water
128 parts of 28.5% aqueous calcium thiocyanate There resulted a foamy dispersion that was readily deaerated by evacuation in a stirred vacuum flask.

A portion of the dispersion was cast on plate glass with a doctor knife set at 20 mils. The glass with dispersion was next heated at 80° C. until coalescence of the polymer had occurred (became clarified), and was then cooled to room temperature. The film was stripped from the glass, after immersion in water, and was washed with water until free of thiocyanate ion. Next, this gel film was softened by being immersed in a 10% solution of polyethylene glycol di-2-ethylhexoate in isopropyl alcohol for one-half hour at room temperature, then was drained and dried 0.5 hour at 50° C. while clamped in a frame at fixed area. The dried film removed from the frame after cooling to room temperature was highly opaque and tough. The opaque film had an average thickness of 0.0080 cm. (3.15 mils) and an open-cell porous structure.

On application of a pressure of 10,000 lb./sq. in. to the above film, it became clear. The clarified film had an average thickness of 0.0040 cm. (1.6 mils). Another film prepared in the same manner with a doctor knife set at 30 mils was 0.0200 cm. (7.8 mils) thick before pressing and 0.0100 cm. (3.9 mils) after clarification at the same pressure.

Optical evaluation of similar opaque and clarified films prepared from 75/25 acrylonitrile/isobutylene copolymer with the General Electric recording spectrophotometer gave the following results:

| Nature of Film | Thickness (Mils) | Percent Transmission or Reflectance (R) at Various Wavelengths | | |
|---|---|---|---|---|
| | | 4,000 A. | 5,500 A. | 7,000 A. |
| Opaque | 3.3 | 1.0 (87R) | 3.2 (87.7R) | 5.0 (85R) |
| Clarified | 1.6 | 34 | 66.2 | 72.7 |

*Example VI*

An acrylonitrile/isobutylene copolymer containing 23.6 mol percent of isobutylene and having an average inherent viscosity of about 4.3 was converted to a coalescible dispersion by ball milling the following composition for 20 hours with ½ inch glass beads as follows:

32 parts of copolymer
98 parts of water
128 parts of 28.6% aqueous calcium thiocyanate The resultant foamy dispersion was transferred with the use of 50 parts of water to reduce the viscosity to a stirred vacuum flask and deaerated by alternate evacuation and admission of air.

A film was prepared from the dispersion by casting, at 20 mils, coalescing, washing, softening and drying as in Example IV. The resultant tough, tear-resistant film was translucent and was transformed to brilliant clarity by application of pressure. When a portion of the film was clarified by application of 10,000 lb./sq. in. in pressure, the following results were obtained with the General Electric recording spectrophotometer:

| Nature of Film | Thickness (Mils) | Percent Transmission or Reflectance (R) at Various Wavelengths | | |
|---|---|---|---|---|
| | | 4,000 A. | 5,500 A. | 7,000 A. |
| Opaque | 3.3 | 5.2 (82.5R) | 19.5 (88.5R) | 41.2 (90R) |
| Clarified | 2.5 | 82.5 | 88.5 | 90 |

The film is particularly useful as a tracing paper for reproduction of architectural drawings, maps, etc. In this process, the film is superposed on the original drawing which is then copied with a stylus. The resultant clear line drawing on translucent film serves as a negative for photoprinting positives of the drawings, particularly on photo papers sensitive to short wavelength light.

*Example VII*

An aqueous dispersion of polymethacrylonitrile was prepared by agitating the following materials in a glass bottle for 64 hours at 40° C.: 0.6 part potassium persulfate, 0.4 part sodium bisulfite, 3.0 parts sodium lauryl sulfate, 360 parts water and 240 parts methacrylonitrile. There was obtained a fluid aqueous dispersion having a solids content of 39.1% of substantially spherical polymethacrylonitrile particles less than 3 microns.

To 80 parts of the above aqueous polymethacrylonitrile dispersion was added 128 parts of a 27.5–30% calcium thiocyanate aqueous solution. This mixture was ball-milled for four hours followed by filtration through a coarse cloth filter into a vacuum filtration glass flask containing a magnetic stirring bar. After removal of the filtering funnel, the flask was stoppered and gases removed from the liquid by alternate subjection to vacuum, then admission of air while the contents were being stirred. This is to prevent pinholes in the final film. The dispersion was then cast on a glass plate using a doctor knife set at 20 mils. The coated plate was placed in an air oven at 80° C. for about 15 minutes to effect coalescence of the dispersion and formation of a film. The film was then stripped and washed with water until the wash water was free of thiocyanate ion. At this point the gel film was opaque. The opaque film was then immersed in a 10% solution of dibutylphthalate in isopropyl alcohol for one-half hour to soften it. Excess liquid was removed and the opaque softened sheet was then clamped in position and dried at constant area in an air oven at 50° C. for one-half hour. After drying, the frame was removed, leaving an opaque dry film which was about 3 mils thick and which contained voids having an open-cell structure of about 0.8 micron diameter.

One piece of the film obtained as described above was placed in a typewriter from which the ribbon had been removed. Typing produced legible, clear typed characters in an opaque field. The typed opaque sheet was placed against photographic paper and exposed to light to produce sharp photo positives. It was also placed between two thin glass plates and used directly as a projection lantern slide.

Another piece of the opaque film was employed for producing hand-drawn characters by use of a pen dipped in liquid cyclic propylene carbonate. A film was obtained which had clear portions where the pen had been drawn across the film.

Transparent figures were also obtained by drawing a stylus across the surface of another piece of the opaque film. A vibratory impacting stylus was also employed to give clear figures. In contrast to this clarification, the use at ordinary pressures of a pen with aqueous base ink or a wax crayon was not effective in the production of preferential clarification, but did leave legible marks, showing the affinity of the unclarified film for common writing materials.

A replica of an artistic engraving on copper was transferred to a piece of the opaque film by placing the engraving face on the film followed by application of a pressure, which was such that the deepest inset areas received little pressure. The farthest projecting elements of the engraving caused complete clarification of the film at that point. The resultant impression of the engraving was used to prepare extremely sharp photo reproductions of the engraving.

The following table shows some physical properties of typical opaque polymethacrylonitrile films obtained as in the above example.

| Property | Result |
| --- | --- |
| Tensile | 1,400 lb./sq. in. |
| Elong. at-break | 11.4%. |
| Tensile Modulus | 135,000 lb./sq. in. |
| Tear | 2.25 g./mil. |
| Toughness (Charpy Impact) | 6.15 ft./lb. sq. in. |
| Water Vapor Permability | 3,500 g. transported at 39.5° C. at 53 mm. Hg pressure differential of water vapor of a 3-mil thick film of 100 sq. meters per hour. |

Light transmission on a G.E. recording spectrophotometer of a 2-mil film prepared in the above manner (except 15% of a butadiene/acrylonitrile/styrene copolymer of 62/28/10 composition as an aqueous dispersion containing 40% solids was added to the polymethacrylonitrile and the mixture ball milled for 16 hours) was 1% (92% reflectance) at 4000 A., 3.7% (85% reflectance) at 5500 A., and 5.7% (78.5% reflectance) at 1000 A. After pressing at 10,000 pounds per square inch (with a 26% reduction in thickness), the film had a transmission of 45% at 4000 A., 55.7% at 5500 A., and 63.4% at 7000 A.

Example VIII

To 29 parts of a latex containing 34% of a copolymer of acrylonitrile/isobutylene (of 75/25 mole percent) and 45 parts of water was added 0.13 of an antioxidant, 2,2' - methylenebis - (4-methyl-6-tert.-butylphenol), 7.8 parts of a latex containing 42% of a copolymer of acrylonitrile/butadiene (45/55) and 30 parts of 57% aqueous calcium thiocyanate. The mixture was ball milled for two hours.

The resultant dispersion of polymer particles of average diameter less than 3 microns was cast by a doctor knife in the conventional manner, dried at 50° C. for about 10–15 minutes, washed with isopropyl alcohol, softened as in Example V with polyethylene glycol di-2-ethylhexoate and dried at fixed area. The pore size was determined as in Example II. The volume of voids or pores having a diameter of greater than 0.06 micron was 34%. Only 4.7% of this measured volume had diameters of 1.0 micron or larger and a total of only 9.7% more than 0.4 micron in diameter. Void or pore volume calculated on the basis of bulk density was 57%. The film therefore had over 20% voids or pores of a size less than 0.06 micron in diameter.

When films of the above dispersion were cast at a thickness of 7 mils on 2 and 5 mil thick polyethylene terephthalate film and treated in the above manner, opaque coatings with good adhesion to the clear substrate film were obtained. The coating on the 2-mil thick substrate had a thickness of 1.3 mils and transmitted 4.9% of light (at 4000 A.). After pressing at 10,000 lb./sq. in., it had a thickness of 0.9 mil and transmitted 42% of the light.

The opaque films of this invention have also been obtained by an alternate process. This comprises the formation of a clustered dispersion, for example, from a polyvinyl chloride dispersion in aqueous cyclohexanol, casting and partial evaporation to a non-flowable, crack-free condition. In this situation, only a slight clarification occurs during evaporation and tackiness does not develop even on heating to remove the non-solvent dispersion medium. A liquid polymer solvent, such as dioxane, is next applied by immersing or flooding the coating with it. Removal of solvent by washing is conducted immediately without additional evaporation. After washing and drying, a film is obtained with unusually high strength, opacity and porosity and which has a matte top surface which is less glossy than obtained by the usual process. The film has high ink receptivity. The separation and recovery of organic dispersion media from polymer solvent media is simplified by this process, which is also applicable to polystyrene as shown by the following:

Example IX

To 20 parts of a 38.2% polystyrene (particles of which ranged from 0.016 to 0.11 micron, average 0.08 micron in diameter) aqueous dispersion was added 10 parts of a 44.9% butadiene/styrene copolymer aqueous dispersion of approximately 50% styrene content, 4 parts of para-tert-amylphenoxyethanol (a softener) and 35 parts of tert-butyl alcohol. This mixture was ball-milled sixteen hours to yield a fluid, but thixotropic dispersion. This dispersion was cast at a thickness of 10 mils on a glass plate. The coated plate was placed in an air oven at 50° C. until partial coalescence but no tackiness had occurred. After being cooled to room temperature, the coated plate was flushed with dioxane and then immediately with water. Finally, the coating was stripped, washed in water and dried. The resultant opaque film was 2.1 mils thick and was clarified by applying 10,000 lb./sq. in. pressure at 24° C. with a permanent deformation of 20.4%. The resultant change in transmission at various wave lengths was 0.75% to 45% at 4000 A., 1.8% to 63.2% at 5500 A., 2.5% to 72.75% at 7000 A. It was found that at 65° C., 5,000 lb./sq. in. was adequate to clear the opaque film to about 90% transmission of light at 5500 A. (Light transmission measurements were made with a General Electric recording spectrophotometer.) Similar films at 1.55–1.75 mils thickness had a water vapor permeability of 3,030 g., a tensile strength of 896 lb./sq. in., an elongation of 46.9% and a modulus of 69,000 lb./sq. in. Several other polymer solvent-precipitant treatments used in place of dioxane-water also resulted in opaque, pressure-clearable films, such as acetone-water, ethyl acetate-ethyl alcohol, ethyl methyl ketone-water, and methyl isobutyl ketone-ethyl alcohol.

The polymers used are water-insoluble vinylidene-type addition polymers having a molecular weight of 10,000 or higher, which exist as discrete particles at room temperature 25° C. but soften at 40° C. or above. These polymers are hydrophobic, i.e., they are not dissolved, softened, or plasticized by water under normal conditions, even in the form of gel films. A particular advantage of the films of this invention is that polymers of high molecular weights, e.g., of the order of several hundred thousand are superior to those formed from lower molecular weight polymers.

Particularly useful polymers are those of vinyl chloride, vinylidene chloride, methacrylonitrile and styrene and copolymers of such monomers and of acrylonitrile with each other or with other monomers such as butadiene, isobutylene and acrylate, such as ethyl acrylate, and methacrylate esters in which the latter monomers are present in minor amounts. An example of a particularly useful copolymer is an acrylonitrile/isobutylene copolymer heaving 23–30% of isobutylene. The most useful polymers contain major amounts of units of a monovinylidene monomer, i.e., one that contains a negative (electron attracting) or polar group, particularly a monovinyl monomer such as vinyl chloride, styrene or acrylonitrile.

The dispersions are therefore readily prepared by mixing finely divided polymer with the solvent-water media in the amounts desired. The dispersed polymer should initially have a particle size less than about 3 microns, preferably 0.005–1.5 microns, sizes in the range of 0.05 to 0.5 micron giving especially desirable results. Such sizes are obtained by mechanical means, such as by the use of micronizers, homogenizers, ball mills, and similar pulverizers if the polymer used is not already in a finely divided state. If the polymer particles are within this size as obtained from aqueous dispersion or emulsion polymerization, simple shaking or stirring is sufficient to give good dispersions, which can be employed directly. In fact, the use of such aqueous dispersions is preferred and permits the preparation of the opaque films without isolation of the polymer or removal of minor amounts of unreacted monomers, dispersing agents, etc. Mixed dispersions of various polymers and copolymers may also be used, preferably those polymers that are compatible in the final film. Fibrous and non-fibrous fillers, e.g., dyes, clay, silica, flame inhibitors, pigments, dispersing agents, etc., may also be added to change the texture, flammability and strength properties of the final films. However, these are incidental to and are unnecessary for the opacity and porosity of the films produced. Large amounts of such fillers are generally not preferred. The dispersions employed in coating can contain clusters of polymer particles of up to 20 times the size of the original polymer particles.

The dispersions employed in the preparation of films of this invention are generally stable against aging or are readily returned to homogeneous casting condition by mild agitation. These dispersions generally contain, on a weight basis, from 2% to 30% of the finely divided polymer, 5% to 80% or more of water, and up to about 60% of a water-soluble inorganic salt or organic solvent. Upon removal by evaporation of sufficient water and any other non-solvent liquid diluent present from the dispersion at a temperature at which the polymer is soluble, the polymer particles start to coalesce. This partial coalescence, which is probably due to change of the surface of the dispersed polymer particles to the solution state, is marked by an abrupt change from an opaque milky or paste-like stage to a hazy to substantially clear material which is extremely viscous (syrupy) or is tacky and rubbery. The molecular weight and concentration of the dissolved polymer determine the properties of the coalesced material. For maximum opacity and porosity in the final film, evaporation is discontinued after partial coalescence, but while the film is in tacky stage.

In some instances, the final opacity of films may be intensified by the use of a wash liquid of lower surface tension than water, for example, isopropyl alcohol, as a wash for the polymer film just prior to drying. Plasticizers or softening agents can be included to an extent of 5–10% of the polymer in the final bath. It is also possible to impregnate the film before drying by the use of dyes.

The films of this invention are strong, generally opaque and have a thickness of 0.5–50 mils. Those of thickness of 1–5 mils are particularly useful as paper substitutes while thicker films are useful as porous substitutes for leather. Those of moderate opacity are useful as a tracing paper for reproduction of maps, drawings, etc., by superposing the film on an original and copying by a stylus. Because of their higher opacity at 4000 A. than at visible wave lengths, the resultant clear line drawing on the translucent film is suitable as a negative for photoprinting normally conducted by exposure to light in the vincinity of 4000 A. The films can also be selectively cleared by the action of heat, such as infrared, and by the application of polymer solvents by pen. A further use of these films is for the production of several copies of typed (without ink ribbon) material without the use of carbon paper. The films also accept ink readily. These films are advantageous over conventional papers in their opacity per unit thickness without fillers. Films from chlorine-containing polymers are generally difficult to burn. The films generally have high strengths when wet as well as dry and are relatively stable in dimensions. They are also useful as insulation, artificial leathers, textile-like films, light diffusing coatings and panels, acoustic paneling, dielectric spacers, wall paper, and when coated with adhesive, they are useful for medical bandages and pressure-clearable labeling tapes.

The opaque, porous films of the hydrophobic polymers have a bulk density that is considerably less than for the polymer in clear form (generally not more than 75% of the usual density). The opaque and non-fibrous films contain generally about 20–80%, preferably 35–65%, by volume of open-cell pores. The films have a water permeability of at least 1,000 grams for a 1 mil thick film (as described in Example II).

Image-bearing records made by the use of these films can be made less sensitive to damage by pressure by impregnating them with stiffening agents, e.g., silica gel or thermosetting resins, followed by heating.

The usual combination of high initial opacity with the clarity attained after subjecting these films to pressure is the basis for many novel and useful applications. The films of this invention have the property of transmitting no more than 10% and preferably less than 5% of light (measured at 4000 A. by a General Electric spectrophotometer, Cat. 5962004G65, wherein the light-receiving apparatus is about an inch from the film on a film of about 3-mils thickness. Thicker films transmit less light, while considerably thinner films may transmit more light. The unexpected opacity may be related to the uniformity of the pore size distribution in the films coupled with their small size (i.e., the pores substantially have a diameter of less than a micron and the major part is less than ½ micron). The pores can be collapsed by the application of energy such as pressure or heat. For purposes of definition, the use of 10,000 lb./sq. in. brings about the change of an opaque film of ordinary thickness (e.g., up to 5 mils) to a clear or transparent film. Thus pressed, the light transmission may depend upon the polymer employed, but in any event is increased by at least three-fold and preferably five times or more with the most useful films exhibiting an improvement in transmission of ten fold or higher (as measured in the above described fashion). It is to be noted that clear films as obtained by conventional solvent casting methods generally do not transmit over 90% of light at 4,000 A.

The initial porosity and opacity coupled with the ease of clarification as well as other physical properties of these films are of particular advantage in many ways. Coatings of the films can, if desired, be made on flexible supports. Optical density of the films can be increased by precipitation of pigments or dyes in the pores. Fillers or magnetic particles can also be incorporated in the films to change their electrical or other properties. These and other applications are more fully illustrated in the following description.

Flexible supports (e.g., of 0.1 to 10 mils thick) can be coated with films of this invention on either or both sides. Thus, an aqueous dispersion in which the initial polymer particle sizes were about 0.2 micron of a mixture of vinyl chloride/vinylidene chloride and styrene/butadiene copolymers with tetramethylurea and tert.-butyl alcohol was cast on 5 mil polyethylene terephthalate film, dried, and washed in the usual manner. The coating (or film) was opaque and highly adherent. A further dispersion corresponding to that in Example II was cast on a 0.25-mil polyethylene terephthalate film using a doctor knife clearance of 10 mils. The coating was allowed to dry in air for 17 minutes. It was washed with water until the tetramethylurea was substantially removed. A similar coating was applied to the reverse side of the film, partially dried and washed as above. The doubly coated film was blotted and allowed to dry in air. It has a thickness of 4.3 mils, high tear strength and high opacity. Coatings can likewise be made on paper, cloth, metals, wood, masonry surfaces, and other rigid or flexible supports.

Films of increased optical density can be obtained as follows:

A pressure-coalescible film prepared from an acrylonitrile/isobutylene/vinylidene chloride terpolymer (37.5/37.5/25 monomer charge weight ratio), using aqueous $Ca(SCN)_2$, was pressed with a metal type-form to give a clarified image in the film corresponding to the raised portions of the type. The film was soaked in a 10% solution of lead nitrate for 2–3 minutes, wiped dry, soaked in a 20% solution of sodium sulfide for 2–3 minutes, rinsed in water and dried. This resulted in deposition of black lead sulfide only in the uncoalesced and porous areas of the film, with a large difference in optical density between the areas clarified by the type form and the rest of the film, i.e., a negative had been prepared by a nonphotographic process.

The negative was used to expose a photopolymer printing plate as described in U.S. 2,760,863. With an exposure sufficient to hold 0.002 inch high light dots in a halftone, a good image was obtained in the final plate. That is, the recesses in small o's, e's, etc. were of satisfactory depth. The plate was suitable for letter-press printing.

A codispersion of a 60/40 styrene/butadiene copolymer and a vinyl chloride/vinylidene chloride copolymer was diluted with tetramethyl urea/tert. butyl alcohol and cast on a 3-mil polyethylene terephthalate film to give an opaque coating. A portion of the coated film was pressed against a heated, metal type-form in a proof-press. The coating was clarified where it had contacted the type. The selectively clarified coating was treated as described above to deposit lead sulfide. The negative thus produced was used to prepare a lithographic plate from which excellent reproductions of the original type were printed.

A similar coated film was pressed in a proof press against a heated copper engraving comprising letters, halftones and large flat areas. The optical density of the partially clarified coating was increased in the background areas by "in situ" deposition of lead sulfide. The negative thus prepared was used to expose a photopolymer printing plate. Printings from the plate were of high quality not only in the type areas but also in the half-tone and large flat areas.

Various films and coatings, prepared according to the methods of this invention, were further opacified by "in situ" deposition of not only lead sulfide as described but by Prussian blue, chromates, and water soluble dyes. Optical densities up to 4.5 were obtained in many cases as measured by a Welch densichron.

A portion of a coated film was selectively clarified by typing on it with a regular typewriter with the ribbon disengaged and by hand with styli of different tip radii to give lines of different widths. The background was opacified to a high degree by soaking in a 2.5% aqueous solution of a black dye, Color Index No. 15710, after chromed with a ligand/chrome ratio of 2, blotting and drying. The optical density of the thus dyed background was 3.1 as measured with a Welch densichron.

The selectively clarified, optically densified coating on its clear film base was then used as a negative for producing a lithographic plate. Excellent printings were prepared from the plate. Photocopies and "Ozalid" reproductions were also prepared from the negative.

The following detailed description shows composite sheets having an opaque pressure-clarifiable layer and a colored or pigmented layer:

Two modified dispersions were prepared as in Example II except that one of them contained 1 part of "Darco" activated carbon for each 6.6 parts of polymer calculated on a dry basis. The dispersions were ball milled about 6 hrs., filtered and deaerated. The pigmented dispersion was cast on a glass plate using a doctor knife clearance of 5 mils. The film was allowed to dry in air for about 6 minutes until it was just "clear," i.e., no longer milky. The unpigmented dispersion was cast on top of it at once using a doctor knife clearance to the glass of 10 mils. The top coating was allowed to dry in air for about 13 minutes until it became clear. The plate was placed in water. The composite film soon soaked free. When washing was complete, the film was removed, blotted and let dry. It was 3.1 mils thick and was black on one side and colorless on the other. When the film or a stack of several pieces of it was type on without a ribbon or was stroked with a stylus, the unpigmented layer became clarified and exposed the pigmented layer beneath. The result was a highly legible image that contrasted well with the colorless opaque background.

A similar product 2.7 mils thick comprised of doubly coated paper the first coating being black and the topcoat being colorless and opaque. It was adapted to the making of multiple copies by typing or by hand with a stylus without using a carbon paper interleaf between the sheets. That is, when a stack of several sheets of the product was typed without a ribbon or worked with a stylus by hand, a black image against a contrasting colorless background was produced on each sheet by virtue of pressure clarification of the topcoat with exposure of the underlying black layer.

Opaque, porous polymer films containing conducting, dielectric or magnetic materials can be prepared as follows:

A dispersion similar to that described in Example II was prepared from the following ingredients: 10 parts latex of vinyl chloride copolymer, 10 parts tetramethylurea and 15 parts t-butyl alcohol. To the dispersion, 5.6 parts of copper powder was added. The dispersion was filtered through a 100-mesh screen during which the coarser copper particles were filtered out. It was cast on a glass plate with a doctor knife clearance of 10 mils, allowed to dry partially in air for about 9 minutes until it had lost its milky appearance and coagulated and washed in water. The film was blotted and allowed to dry. It had a surface resistivity of $2.7 \times 10^{13}$ ohms/square. Its resistivity after pressing at 10,000 p.s.i. was $1.3 \times 10^{13}$.

A dispersion similar to the preceding was prepared except that 11.7 parts of latex diluted with 10 parts of water was used, and 6 parts of graphite was substituted for the copper. Films were prepared as described above. They had surface resistivities of $2.0 \times 10^5$ and $8.2 \times 10^4$ ohms/square before and after pressing at 10,000 p.s.i. respectively. The addition of twice as much graphite gave films having surface resistivities of $3.0 \times 10^3$ and $1.0 \times 10^3$ ohms/square before and after pressing at 10,000 p.s.i. respectively.

To 7.5 parts of an aqueous dispersion of polyvinyl chloride containing added dimethylformamide and containing about 1 part of polymer was added 1 part of titanium nitride powder. The dispersion was cast, partially dried, coagulated, soaked loose, washed and dried. It had a yellowish gray color and a thickness of 2.2 mils. It had practically no tendency to accumulate a static charge whereas control films prepared without titanium nitride develop high charges. Surface resistivities before and after pressing at 20,000 p.s.i. were >10⁹ and 4.5×10⁵ ohms/square respectively.

The above films are suitable for applications such as printed circuitry where advantage can be taken of the difference in resistivity between pressed and unpressed regions.

A film that can be used as a resistance heater as in a panel heater was obtained by the use of twice as much titanium nitride. The film had a surface resistivity of 32 ohms/square.

A dispersion was prepared using 23.4 parts of a latex containing 55% of a copolymer of vinyl chloride with a minor amount of ethyl acrylate, 10 parts water, 19.4 parts tetramethylurea, 30 parts t-butyl alcohol, and 5.6 parts barium titanate. The dispersion was filtered through a 325-mesh screen, cast on glass with a 5-mil doctor knife clearance, allowed to dry partially in air for about 3 minutes, coagulated and washed in water. The film was blotted and allowed to dry. It had a thickness of 0.7 mil. It had a dielectric constant of 1.9 at 1000 cycles as compared with 1.6 for a control film prepared without barium titanate.

A similar film was prepared except that 325-mesh zinc dust was added to the dispersion. It was cast on glass with a doctor knife clearance of 27 mils, partially dried at 65° C. with low air flow for 16 minutes and washed in water. The film soaked loose from the glass soon after it contacted the water. The washed film was blotted and let dry. It had a thickness of 8.0 mils and a dielectric constant of 2.4 at 1000 cycles as compared with 1.6 for a control film containing no zinc. The film and that directly preceding are suitable for electrical applications such as insulation where a high dielectric constant is needed.

Various opaque, porous films prepared as described in the above general methods were then impregnated with dielectric oils, such as n-propyl o-benzolybenzoate, and mineral oil. The impregnated films are suitable for electrical applications such as the insulating layers in condensers.

Opaque, porous films of a vinyl chloride copolymer containing a small amount of ethyl acrylate were impregnated with 5% aqueous solutions of a surface active agent which contained 38% of the triethanolamine salt of a mixture of dodecyl sulfate and oleyl sulfate in a 7/3 ratio, as well as an antistatic agent consisting of diethanolamine salt of mixed $C_8$ to $C_{21}$ alkyl phosphates as described in U.S. Patent 2,676,122. The films were blotted and allowed to dry. They displayed little or no tendency to develop a static charge whereas untreated control films developed a high charge and attracted dust and other foreign particles.

A dispersion was prepared from the following ingredients:

4.9 parts of a latex containing 55% of a vinyl chloride copolymer containing a small amount of ethyl acrylate, 4.2 parts water, 4.3 parts tetramethylurea, 6.2 parts t-butyl alcohol, and 5 parts of magnetic chromium dioxide. The dispersion was cast on glass with a doctor knife clearance of 15 mils and partially dried in air for about 35 minutes during which it was passed across a strong magnet to orient the chromium dioxide particles. The tacky, partially-coalesced film was soaked loose in water, washed thoroughly and allowed to dry. The film was compacted by rolling between closely spaced rolls. The magnetic films are suitable for application in devices such as tape recorders.

Films of this invention, e.g., acrylonitrile/isobutylene copolymer films are selectively clarified by rolling with a weighted narrow roller at four pressures calculated to range from 2700 to 16200 p.s.i. The successively higher pressures produced increasing clarification of the opaque structure. An opaque film prepared from a codispersion of acrylonitrile/isobutylene copolymer and acrylonitrile/butadiene copolymer was clarified to varying degrees by microwaves produced by a "magnetron" oscillator. An opaque film coated on polyethylene terephthalate film was contacted with the head of an ultrasonic wave generator. As the frequency or amplitude of the waves was varied the coated film was advanced beneath the head. The selective clarification produced in the coating varied with the frequency or the amplitude of the waves. The films and coatings of this invention not only are susceptible to selective clarification but also the degree of clarification can be varied continuously over a wide range. Accordingly these materials are suitable as memory or information storage media. Thus different degrees of clarification produced as described above can be detected at a later time in terms of transmitted light intensity and related to the signals or means of producing them.

These opaque films are also useful as reflective coatings for photopaper. For example a dispersion prepared as in Example II was cast on photopaper base sheet with a doctor knife clearance of 10 mils. The coating was allowed to dry in air for about 15 minutes until it just became clear. It was coagulated and washed in water, blotted and let dry. The coating had a light reflection of 95% as measured with a Welch "densichron." The uncoated base sheet had a reflection of 83% and commercial barium sulfate/gelatin coated photopaper had a reflection of 91%. The coatings thus prepared may be further coated with a photosensitive composition in an appropriate binder. They are then suitable for preparing photoprints, enlargements and the like where a highly reflective coating is desired beneath the silver or other image.

Since many different embodiments of the invention may be made without departing from the spirit and scope thereof, it is to be understood that the invention is not limited by the specific illustrations except to the extent defined in the following claims.

I claim:

1. An opaque film composed of partially coalesced discrete particles of a hydrophobic organic addition polymer having a wholly carbon chain, a molecular weight of at least 10,000 and being taken from the group consisting of vinyl and vinylidene addition polymers, said film having an open-cell structure characterized by microscopic voids communicating with the surface and containing 20% to 80% by volume of open-cell pores, said film having a permeability to water vapor of about 10 times greater than that of corresponding non-porous films of the same polymer and thickness, the opacity per unit of thickness being such that a film thickness of 3 mils and greater has a light-transmission of less than 10% at 4000 A., and increased light transmission at longer wavelengths of light, said film being capable of sustaining a permanent reduction in thickness of at least 20% together with substantially clarification of opaqueness under a pressure of 10,000 pounds per square inch at room temperature.

2. An opaque film composed of a hydrophobic organic addition polymer having a wholly carbon chain, a molecular weight of at least 10,000 and being taken from the group consisting of vinyl and vinylidene addition polymers, said film having an open-cell structure characterized by microscopic voids communicating with the surface and containing 20% to 80% by volume of open-cell pores, said film having a permeability to water vapor of about 10 times greater than that of corresponding non-porous films of the same polymer and thickness, the opacity per unit of thickness being such that a film thickness of 3 mils and greater has a light-transmission of less than 10% at 4000 A., and increased light transmission at longer wavelengths of light, said film being capable of sustaining a permanent reduction in thickness of at least 20% together with substantial clarification of opaqueness to at least a 3-fold increase in light transmission when subjected to a pressure of 10,000 pounds per square inch at room temperature.

3. A porous, opaque, non-fibrous film of low bulk density composed of partially coalesced discrete particles of a hydrophobic organic addition polymer of at least one ethylenically unsaturated monomer selected from the group consisting of vinyl and vinylidene monomers, said polymer having a wholly carbon chain and a molecular weight of at least 10,000, the units of the polymer having an average molecular weight of less than 150; said film having an open cell structure characterized by microscopic voids uniformly disposed throughout and communicating with its surface, the open-cell voids being of substantially uniform size, averaging less than one micron in their greatest diameter and constituting 20% to 80% by volume of the film, said film (a) having a degree of opacity such that a thickness of 3 mils and greater has a light-transmission of less than 10% at 4000 A., and upon being subjected to a pressure of 10,000 lbs. per sq. in. at room temperature has at least a 3-fold increase in light transmission, and (b) sustaining a permanent reduction in thickness of about 20% to about 80% when subjected to such temperature and pressures.

4. A film as defined in claim 3 that is self-supporting and has a thickness from 0.5 to 50 mils.

5. A film as defined in claim 3 wherein said polymer is polymethacrylonitrile.

6. A film as defined in claim 3 wherein said polymer is polyvinyl chloride.

7. A film as defined in claim 3 wherein said polymer is an acrylonitrile/isobutylene copolymer.

8. A film as defined in claim 3 wherein said polymer is a vinyl chloride/vinylidene chloride copolymer.

9. A film as defined in claim 3 wherein said polymer is an acrylonitrile/vinylidene chloride copolymer.

10. A film as defined in claim 3 having a permeability to water vapor at least ten times greater than non-porous, closed-cell films of the same polymer and same film thickness.

11. A film as defined in claim 10 having a bulk density from about 0.25 to 1.0 gram per cubic centimeter.

References Cited in the file of this patent

UNITED STATES PATENTS

| | | |
|---|---|---|
| 2,268,160 | Miles | Dec. 30, 1941 |
| 2,371,868 | Berg | Mar. 20, 1945 |
| 2,542,527 | O'Conor et al. | Feb. 20, 1951 |
| 2,739,909 | Rosenthal | Mar. 27, 1956 |
| 2,762,784 | Foust et al. | Sept. 11, 1956 |
| 2,783,894 | Lovell et al. | Mar. 5, 1957 |